United States Patent
Ma et al.

(10) Patent No.: US 11,999,590 B2
(45) Date of Patent: Jun. 4, 2024

(54) MODULAR ELEVATOR SHEAVE ASSEMBLY

(71) Applicant: OTIS ELEVATOR COMPANY, Farmington, CT (US)

(72) Inventors: Jun Ma, Farmington, CT (US); Alexander Serkh, Troy, MI (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 314 days.

(21) Appl. No.: 17/567,524

(22) Filed: Jan. 3, 2022

(65) Prior Publication Data

US 2023/0211980 A1    Jul. 6, 2023

(51) Int. Cl.
  *B66B 15/00* (2006.01)
  *B29C 70/68* (2006.01)
  *B66B 15/04* (2006.01)
  *B29L 31/00* (2006.01)

(52) U.S. Cl.
  CPC .............. *B66B 15/04* (2013.01); *B29C 70/68* (2013.01); *B29L 2031/748* (2013.01)

(58) Field of Classification Search
  CPC ... B66B 15/04; B29C 70/68; B29L 2031/748; B66D 1/30; B66D 1/7415; B66D 3/04; F16H 55/36; F16H 55/42; F16H 55/46
  See application file for complete search history.

(56) References Cited

U.S. PATENT DOCUMENTS

| | | | |
|---|---|---|---|
| 3,633,432 A | 11/1972 | Horsey | |
| 4,193,310 A | 3/1980 | Boyer et al. | |
| 4,366,609 A | 1/1983 | Speer | |
| 4,913,688 A | 4/1990 | Bekheet | |
| 5,222,919 A | 6/1993 | Stauder | |
| 9,790,054 B2 | 10/2017 | Alasentie | |
| 9,815,667 B2 | 11/2017 | Yu et al. | |
| 10,773,929 B2 | 9/2020 | Ma et al. | |
| 11,001,478 B2 | 5/2021 | Wen et al. | |
| 11,117,787 B2 | 9/2021 | Martin | |
| 2012/0168276 A1* | 7/2012 | Cali | F16H 55/36 192/41 R |
| 2017/0267497 A1* | 9/2017 | Ma | B66B 9/00 |
| 2019/0112156 A1* | 4/2019 | Ma | B66B 7/085 |
| 2019/0323594 A1* | 10/2019 | Arnault | F16H 7/20 |

(Continued)

FOREIGN PATENT DOCUMENTS

| | | |
|---|---|---|
| CN | 2923632 Y | 7/2007 |
| CN | 202897723 U | 4/2013 |

(Continued)

OTHER PUBLICATIONS

Extended European Search Report for Application No. EP 22 21 4347.1 dated May 2, 2023.

*Primary Examiner* — Emmanuel M Marcelo
(74) *Attorney, Agent, or Firm* — Carlson, Gaskey & Olds, P.C.

(57) ABSTRACT

An illustrative example embodiment of an elevator sheave assembly includes a plurality of polymer rings that are secured together. The plurality of polymer rings includes at least two polymer rings that each have an outer circumferential surface that defines a portion of a belt guiding surface adjacent a flange at a longitudinal end of the sheave assembly. The at least two polymer rings each include a bearing supported inside the ring.

20 Claims, 5 Drawing Sheets

(56) References Cited

U.S. PATENT DOCUMENTS

2020/0346899 A1    11/2020   Torlai et al.
2021/0188564 A1     6/2021   Rutkevicius et al.

FOREIGN PATENT DOCUMENTS

| CN | 203794396   U |      | 8/2014  |         |           |
|----|---------------|------|---------|---------|-----------|
| CN | 104071675   A |      | 10/2014 |         |           |
| CN | 203959580   U |      | 11/2014 |         |           |
| CN | 204784229   U |      | 11/2015 |         |           |
| CN | 205222340   U |      | 5/2016  |         |           |
| CN | 205397777   U |      | 7/2016  |         |           |
| CN | 205575321   U |      | 9/2016  |         |           |
| CN | 207078866   U |      | 3/2018  |         |           |
| CN | 109019246   A |      | 12/2018 |         |           |
| CN | 212334306   U |      | 1/2021  |         |           |
| EP | 3056461     A1 | *   | 8/2016  | ............ | B66B 15/02 |
| FR | 3019866     A1 | *   | 10/2015 | ............ | F16C 13/006 |
| JP | 859164450   A |      | 9/1984  |         |           |
| JP | 2005534592  A | *   | 11/2005 | ............ | B66B 15/04 |
| JP | 2009062166  A |      | 3/2009  |         |           |
| WO | 2016019135  A1 |     | 2/2016  |         |           |
| WO | WO-2016019135 A1 | * | 2/2016  | ............ | B66B 15/02 |
| WO | 2018206777  A1 |     | 11/2018 |         |           |

\* cited by examiner

| SITUATE A FIRST POLYMER END RING AT A FIRST LONGITUDINAL END OF THE SHEAVE ASSEMBLY (THE FIRST POLYMER END RING INCLUDING AN OUTER CIRCUMFERENTIAL SURFACE HAVING A FIRST PROFILE THAT DEFINES A FIRST PORTION OF A FIRST BELT-GUIDING SURFACE) |—122

↓

| CONNECT AT LEAST ONE POLYMER INTERMEDIATE RING TO THE FIRST POLYMER END RING (THE AT LEAST ONE POLYMER INTERMEDIATE RING INCLUDING AN OUTER CIRCUMFERENTIAL SURFACE HAVING A PROFILE THAT DEFINES A SECOND PORTION OF THE FIRST BELT-GUIDING SURFACE) |—124

↓

| CONNECT A SECOND POLYMER END RING TO THE AT LEAST ONE POLYMER INTERMEDIATE RING TO SITUATE THE SECOND POLYMER END RING AT A SECOND LONGITUDINAL END OF THE SHEAVE ASSEMBLY (THE SECOND POLYMER END RING INCLUDING AN OUTER CIRCUMFERENTIAL SURFACE HAVING A SECOND PROFILE THAT DEFINES A FIRST PORTION OF A SECOND BELT-GUIDING SURFACE, THE AT LEAST ONE POLYMER INTERMEDIATE RING PROFILE DEFINING A SECOND PORTION OF THE SECOND BELT-GUIDING SURFACE) |—126

FIG. 12

MODULAR ELEVATOR SHEAVE ASSEMBLY

BACKGROUND

Elevator systems are useful for carrying passengers and items between different levels of a building. Many elevator systems are traction-based and include roping that suspends the elevator car and a counterweight. A machine causes movement of a traction sheave that, in turn, causes movement of the roping for moving the elevator car as desired. The roping typically follows a path that includes several sheaves.

Elevator sheaves include a surface that engages the roping. Different roping configurations exist, such as round steel ropes and flat belts. There are different sizes of belts for different duty or load capacities. While a variety of roping options are useful, they present the challenge of maintaining inventory of a corresponding variety of sheaves for installation or replacement over time.

SUMMARY

An illustrative example embodiment of an elevator sheave assembly includes a plurality of polymer rings that are secured together. The plurality of polymer rings includes at least two polymer rings that each have an outer circumferential surface that defines a portion of a belt guiding surface adjacent a flange at a longitudinal end of the sheave assembly. The at least two polymer rings each include a bearing supported inside the ring.

In addition to one or more of the features described above, or as an alternative, the at least two polymer rings are a first polymer end ring and a second polymer end ring, the first polymer end ring is at a first longitudinal end of the sheave assembly, the outer circumferential surface of the first polymer end ring has a first profile that defines a first portion of a first belt-guiding surface, the second polymer end ring is at a second longitudinal end of the sheave assembly, the outer circumferential surface of the second polymer end ring has a second profile that defines a first portion of a second belt-guiding surface, the plurality of polymer rings includes at least one polymer intermediate ring situated between and connected to the first and second polymer end rings, and the at least one polymer intermediate ring includes an outer circumferential surface having a profile that defines a second portion of the first belt-guiding surface and a second portion of the second belt-guiding surface.

In addition to one or more of the features described above, or as an alternative, the at least one polymer intermediate ring comprises a plurality of polymer intermediate rings including a first intermediate ring that is received adjacent and connected to the first polymer end ring and a second intermediate ring that is received adjacent and connected to the second polymer end ring, the profile of the outer circumferential surface of the first intermediate ring defines the second portion of the first belt-guiding surface, and the profile of the outer circumferential surface of the second intermediate ring defines the second portion of the second belt-guiding surface.

In addition to one or more of the features described above, or as an alternative, the first intermediate ring is connected to the second intermediate ring, the profile of the outer circumferential surface of the first intermediate ring defines a first portion of a third belt-guiding surface, and the profile of the outer circumferential surface of the second intermediate ring defines a second portion of the third belt-guiding surface.

In addition to one or more of the features described above, or as an alternative, the profile of the outer circumferential surface of the first intermediate ring is the same as the profile of the outer circumferential surface of the second intermediate ring.

In addition to one or more of the features described above, or as an alternative, the plurality of polymer intermediate rings includes at least one third intermediate ring between and connected to the first and second intermediate rings, the profile of the outer circumferential surface of the first intermediate ring defines a first portion of a third belt-guiding surface, the profile of the outer circumferential surface of the second intermediate ring defines a first portion of a fourth belt-guiding surface and the profile of the outer circumferential surface of the at least one third intermediate ring defines a second portion of the third belt-guiding surface and a second portion of the fourth belt-guiding surface.

In addition to one or more of the features described above, or as an alternative, the at least one third intermediate ring comprises two third intermediate rings, the two third intermediate rings are connected together at a longitudinal center of the elevator sheave assembly, and the profiles of the outer circumferential surfaces of the two third intermediate rings define a fifth belt-guiding surface at the longitudinal center of the elevator sheave assembly.

In addition to one or more of the features described above, or as an alternative, the polymer of each of the at least two polymer rings is over-molded onto a portion of the bearing to maintain the bearing within the ring.

In addition to one or more of the features described above, or as an alternative, each of the rings includes only a single bearing.

In addition to one or more of the features described above, or as an alternative, the single bearing is situated at a position corresponding to a concentration of a load on the ring.

In addition to one or more of the features described above, or as an alternative, the elevator sheave assembly includes connectors that secure the at least one polymer intermediate ring to the first polymer end ring and the second polymer end ring.

In addition to one or more of the features described above, or as an alternative, the connectors comprise separate pieces received at least partially into lateral surfaces on the polymer rings.

In addition to one or more of the features described above, or as an alternative, the connectors are formed as part of the polymer rings.

In addition to one or more of the features described above, or as an alternative, the first and second polymer end rings include at least one of projections extending from a lateral surface and recesses in the lateral surface, the at least one polymer intermediate ring includes at least one of recesses in lateral surfaces on the at least one polymer intermediate ring and projections extending from the lateral surfaces on the at least one polymer intermediate ring, and the projections and the recesses cooperate to connect the at least one polymer intermediate ring to the first and second polymer end rings.

An illustrative example embodiment of a method of making an elevator sheave assembly includes situating a first polymer end ring at a first longitudinal end of the sheave assembly, the first polymer end ring including an outer circumferential surface having a first profile that defines a first portion of a first belt-guiding surface; connecting at least one polymer intermediate ring to the first polymer end ring, the at least one polymer intermediate ring including an outer circumferential surface having a profile that defines a second portion of the first belt-guiding surface; and connecting a second polymer end ring to the at least one polymer intermediate ring to situate the second polymer end ring at a second longitudinal end of the sheave assembly, the second polymer end ring including an outer circumferential surface having a second profile that defines a first portion of a second belt-guiding surface, the at least one polymer intermediate ring profile defining a second portion of the second belt-guiding surface.

In addition to one or more of the features described above, or as an alternative, the at least one polymer intermediate ring comprises a plurality of polymer intermediate rings including a first intermediate ring and a second intermediate ring. The method also includes connecting the first intermediate ring to the first polymer end ring, connecting the second intermediate ring to the second polymer end ring, and connecting the first intermediate ring to the second intermediate ring.

In addition to one or more of the features described above, or as an alternative, the profile of the outer circumferential surface of the first intermediate ring defines the second portion of the first belt-guiding surface; the profile of the outer circumferential surface of the first intermediate ring defines a first portion of a third belt-guiding surface; the profile of the outer circumferential surface of the second intermediate ring defines the second portion of the second belt-guiding surface; and the profile of the outer circumferential surface of the second intermediate ring defines a second portion of the third belt-guiding surface.

In addition to one or more of the features described above, or as an alternative, the first profile is the same as the second profile and the profile of the outer circumferential surface of the first intermediate ring is the same as the profile of the outer circumferential surface of the second intermediate ring.

In addition to one or more of the features described above, or as an alternative, the method also includes over-molding the material of the first polymer end ring onto a bearing and over-molding the material of the second polymer end ring onto a bearing.

In addition to one or more of the features described above, or as an alternative, the method also includes situating the bearing of each of the polymer end rings in a position corresponding to a concentration of a load on the polymer end ring.

The various features and advantages of at least one disclosed example embodiment will become apparent to those skilled in the art from the following detailed description. The drawings that accompany the detailed description can be briefly described as follows.

DETAILED DESCRIPTION

Figure 1:
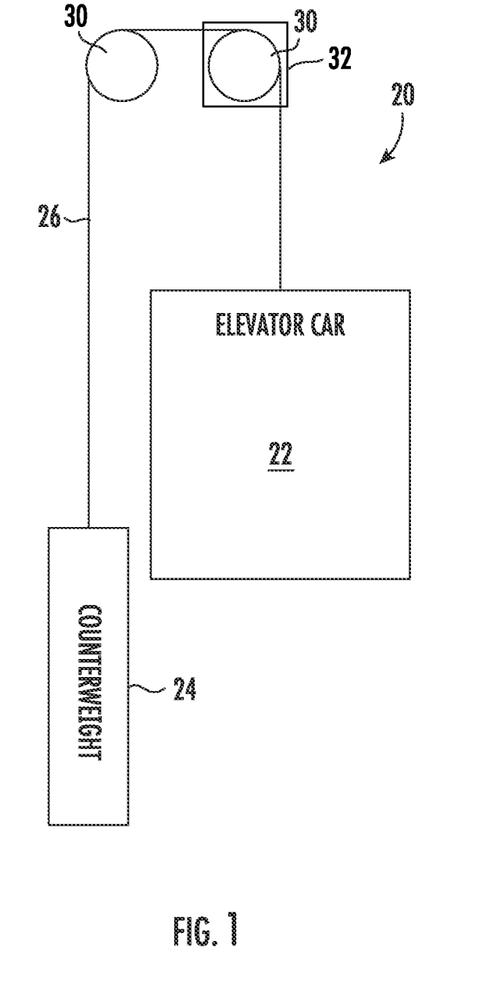
FIG. 1 schematically illustrates selected portions of an elevator system.

FIG. 1 schematically illustrates selected portions of an elevator system 20. An elevator car 22 is coupled to a counterweight 24 by roping 26. Although not shown in detail, the roping 26 includes a plurality of tension members, which in this case comprise flat belts. The roping 26 follows a path defined, at least in part, by sheaves 30. At least one of the sheaves 30 is a traction sheave associated with a machine 32 that selectively causes movement of the roping 26 to control the movement and position of the elevator car 22 for providing elevator service to passengers. The other illustrated sheave 30 is an idler sheave that rotates as the roping 26 moves during movement of the elevator car 22.

Figure 2:
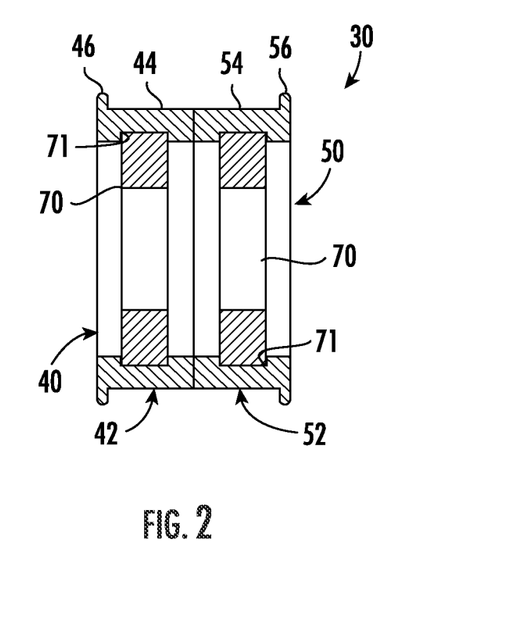
FIG. 2 is a cross-sectional view that schematically illustrates an example embodiment of an elevator sheave assembly.

FIG. 2 shows an elevator sheave assembly that is useful, for example, as the idler sheave 30. The elevator sheave assembly includes a plurality of polymer rings that are secured together to establish at least one belt-guiding surface. The plurality of polymer rings in the example embodiment of FIG. 2 includes two polymer rings, one of which is a first polymer end ring 40 at a first longitudinal end of the sheave assembly. The first polymer end ring 40 includes an outer circumferential surface 42 having a first profile that defines a portion 44 of a belt-guiding surface. A flange 46 is situated along an outer lateral edge of the first polymer end ring 40. The flange 46 establishes one end of the belt-guiding surface.

The other of the two polymer rings in this example embodiment is a second polymer end ring 50 situated at a second, opposite longitudinal end of the elevator sheave assembly. The second polymer end ring 50 includes an outer circumferential surface 52 that defines another portion 54 of the belt-guiding surface. A flange 56 at an outer lateral edge of the second polymer end ring 50 establishes another outer edge of the belt-guiding surface.

Each of the two polymer end rings 40, 50 includes a bearing 70 supported within the ring. The polymer material of the polymer rings 40, 50 is over-molded onto the respective bearing 70 so that the bearing is maintained within a groove 71 that is molded about the exterior of the bearing 70.

The embodiment of FIG. 2 is configured to accommodate a single belt on the belt-guiding surface comprising the portions 44 and 54. Other embodiments are configured to accommodate a plurality of belts.

Figure 3A:
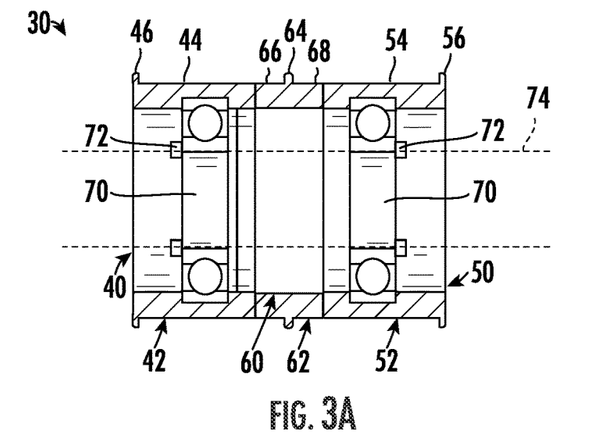
FIGS. 3A and 3B are a cross-sectional views that schematically illustrate example embodiments of an elevator sheave assembly including a polymer intermediate ring.

An example embodiment configured to accommodate two belts is shown in FIG. 3A where the outer circumferential surface 42 defines a first portion 44 of a first belt-guiding surface and the outer circumferential surface 52 defines a first portion 54 of a second belt-guiding surface. At least one polymer intermediate ring 60 is situated between and connected to the first polymer end ring 40 and the second polymer end ring 50. The polymer intermediate ring 60 includes an outer circumferential surface 62 having a profile that includes a rib 64. The profile of the outer circumferential surface 62 defines a second portion 66 of the first belt-guiding surface and a second portion 68 of the second belt-guiding surface. The rib 64 separates the first belt-guiding surface 44, 66 from the second belt-guiding surface 54, 68.

The first polymer end ring 40 is connected to the polymer intermediate ring 60 along adjacent lateral edges of those rings. Similarly, the second polymer end ring 50 is connected to the polymer intermediate ring 60 along adjacent lateral edges of those rings. All of the polymer rings 40, 50 and 60 are fixed together so that they rotate in unison during movement of the flat belts of the roping 26.

The first polymer end ring 40 and the second polymer end ring 50 in this embodiment each include a bearing 70. The polymer material of each ring is over-molded onto the bearing 70 such that the bearing remains fixed in a desired location between the lateral edges of the ring. Over-molding the polymer material onto the bearing 70 of each ring allows for strategically placing the bearing 70 at a location where load on the ring will be concentrated as the sheave 30 engages the roping 26, which suspends the load of the elevator car 22 and counterweight 24.

As shown in FIG. 3A, retention rings 72 are received in notches in a shaft 74 that defines an axis of rotation of the sheave 30. The bearings 70 rotate about the shaft 74 to facilitate rotation of the sheave 30.

Figure 3B:
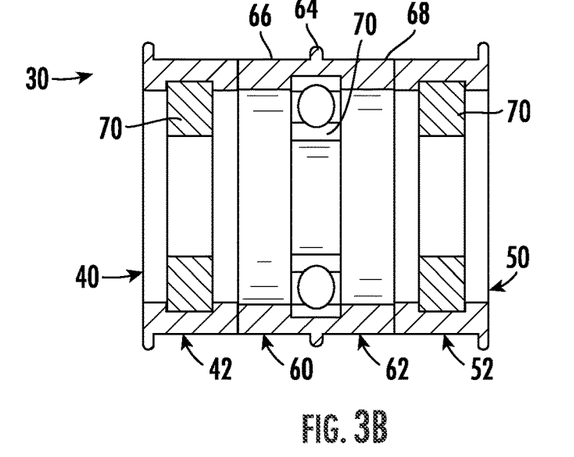

In the embodiment shown in FIG. 3A, the intermediate ring 60 does not include its own bearing 70. Another example embodiment is shown in FIG. 3B in which the intermediate ring 60 includes its own bearing 70. The embodiment in FIG. 3B is configured to accommodate belts of a wider width compared to those that would be used with the sheave 30 shown in FIG. 3A. The additional width of the belt guiding surfaces is accommodated by a larger longitudinal dimension of the polymer intermediate ring 60 in the embodiment shown in FIG. 3B.

Figure 4:
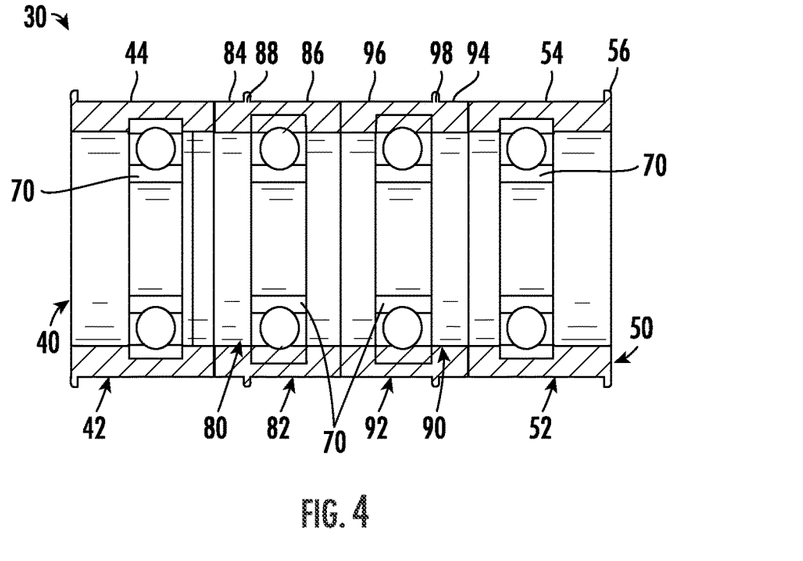
FIG. 4 is a cross-sectional view schematically illustrating an embodiment of an elevator sheave assembly including two polymer intermediate rings.

FIG. 4 shows another embodiment of an elevator sheave assembly that includes a plurality of polymer intermediate rings. A first polymer intermediate ring 80 is received against and connected to an inner lateral edge of the first polymer end ring 40. The first polymer intermediate ring 80 has an outer circumferential surface 82 with a profile that defines a second portion 84 of the first belt-guiding surface. The outer circumferential surface 82 also defines a first portion 86 of a third belt-guiding surface. A rib 88 separates the second portion 84 of the first belt-guiding surface from the first portion 86 of the third belt-guiding surface.

A second polymer intermediate ring 90 has one lateral edge received against an inner lateral surface of the second polymer end ring 50. Another lateral edge of the second polymer intermediate ring 90 is received against an adjacent lateral surface on the first polymer intermediate ring 80. All of the rings 40, 50, 80 and 90 are secured together to rotate in unison.

The second polymer intermediate ring 90 includes an outer circumferential surface 92 that defines a second portion 94 of the second belt-guiding surface and a second portion 96 of the third belt-guiding surface. A rib 98 separates the portions of the second polymer intermediate ring 90 that contribute to the second and third belt-guiding surfaces, respectively.

Figure 5:
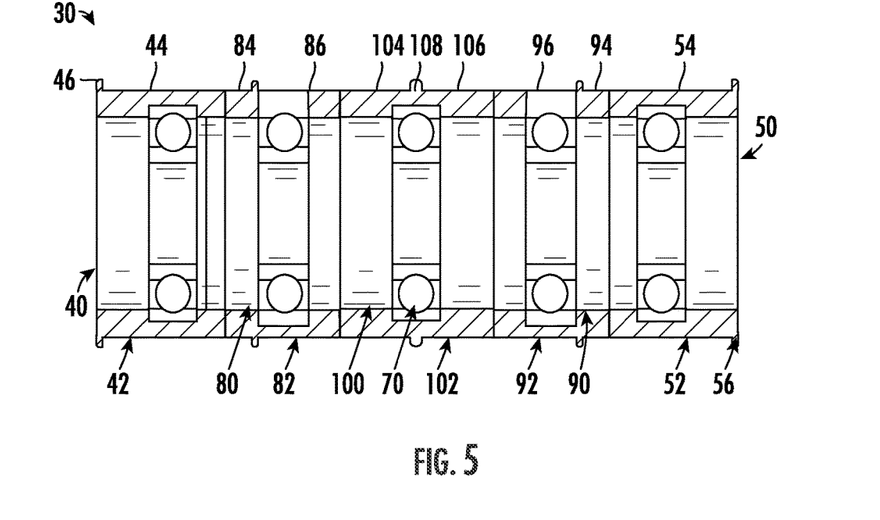
FIG. 5 is a cross-sectional view schematically illustrating another example elevator sheave assembly including three polymer intermediate rings.

The embodiment of FIG. 4 is configured to accommodate three belts. FIG. 5 shows another embodiment that is configured to accommodate four belts. In this example embodiment, a third polymer intermediate ring 100 is situated between the first polymer intermediate ring 80 and the second polymer intermediate ring 90. The third polymer intermediate ring 100 also has an outer circumferential surface 102. The profile of the outer surface 102 defines a second portion 104 that cooperates with the portion 86 of the first polymer intermediate ring 80 to establish a third belt-guiding surface. Another portion 106 of the outer surface 102 cooperates with the portion 96 of the second polymer intermediate ring 90 to establish a fourth belt-guiding surface. A rib 108 separates the portions 104 and 106 and establishes an inner edge of each of the third belt guiding surface and the fourth belt guiding surface.

Figure 6:
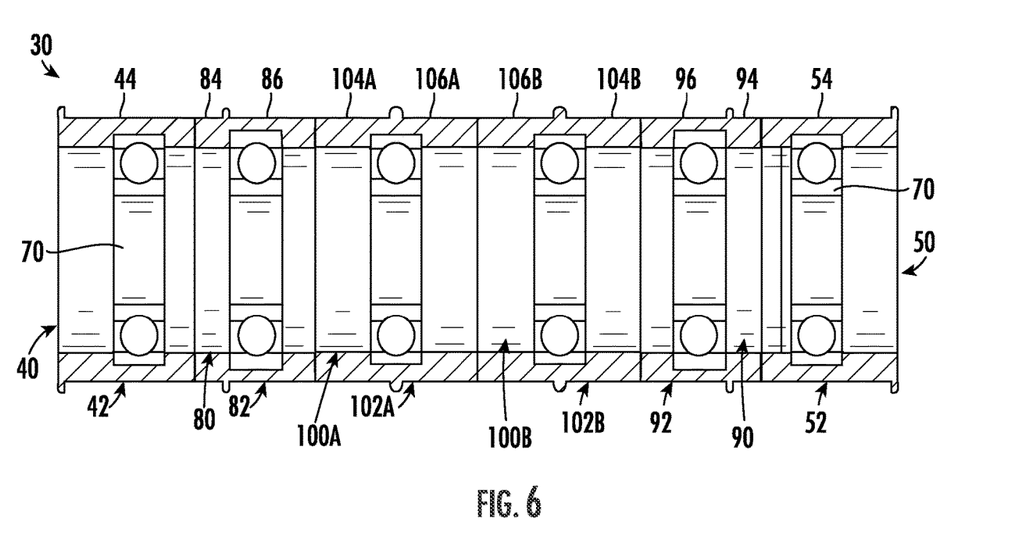
FIG. 6 is a cross-sectional view schematically illustrating another elevator sheave assembly including four polymer intermediate rings.

The embodiment in FIG. 6 includes another polymer intermediate ring and is configured to accommodate five belts. In this embodiment, the polymer intermediate ring 100A includes an outer circumferential surface 102A having a profile including a portion 104A that, together with the portion 86 of the first polymer intermediate ring 80, defines a third belt-guiding surface. The polymer intermediate ring 100B has an outer circumferential surface 102B including a portion 104B that, together with the portion 96 of the second polymer intermediate ring 90, defines a fourth belt-guiding surface. Portions 106A and 106B define a fifth belt-guiding surface at a longitudinal center of the sheave assembly.

As can be appreciated from the drawings, the first polymer end ring 40 and the second polymer end ring 50 have the same configuration with the same profile on the outer circumferential surfaces 42 and 52. In other words, the polymer end rings 40 and 50 are interchangeable because they are identical components. Similarly, the first polymer intermediate ring 80 and the second polymer intermediate ring 90 are identical components. The polymer intermediate rings 100, 100A and 100B are identical. With just those three configurations of a polymer ring, a variety of elevator sheave assembly configurations are possible to accommodate a desired number of belts. Additionally, depending on which polymer ring is selected for each position in the elevator sheave assembly, different belt widths can be accommodated.

Including an intermediate ring such as the polymer intermediate ring 60 shown in FIG. 3A brings the total number of different ring components up to four. It follows that with just four types of rings, a wide range of elevator sheave assembly configurations are possible. The modularity and interchangeability of the polymer rings simplifies the task of maintaining adequate inventory of sheave assembly components to meet the needs of a variety of elevator installations.

One way in which the example elevator sheave assemblies differ from traditional, metal sheave configurations is that the bearings 70 are strategically placed at selected locations along the entire length of the sheave assembly. With traditional, metal sheave configurations, bearings could be press fit only into the ends of a sheave but were not present in the central portion of the sheave. With the individual polymer rings each having a bearing, it is possible to strategically distribute the load across the bearings along the entire length of the sheave. The position of the bearings 70 within each ring can be selected to be aligned with a concentration of load on that ring when the elevator sheave assembly is used in the elevator system 20.

In some embodiments, the polymer material used for making the rings is a plastic material comprising nylon. One example material is known in the industry as nylon 66 and includes glass fiber content on the order of 30% to 60%. Such polymer materials provide some flexibility or resilience along the length of the elevator sheave assembly. That aspect of the polymer material contributes to being able to strategically locate a bearing at a position where the load on the ring is most concentrated when the elevator sheave assembly is in use in an elevator system.

Figure 7:
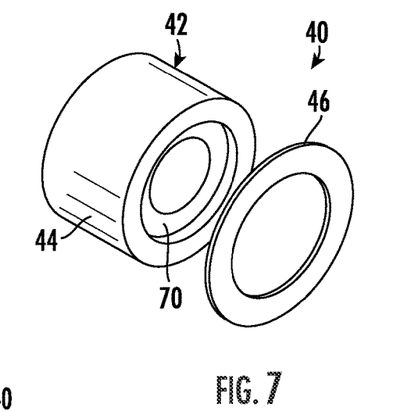
FIG. 7 is a partially exploded view of an example embodiment of a polymer end ring.

The polymer rings of the illustrated example embodiments may have the entire profile of the outer circumferential surface established during a molding process in which the ring is molded. Alternatively, as shown in FIG. 7, a separate flange 46 may be secured to an outer lateral edge of a polymer end ring.

Figure 8:
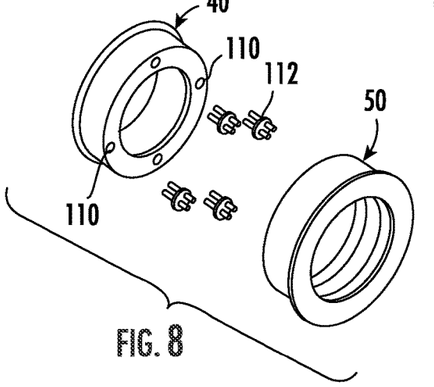
FIG. 8 is a partially exploded view showing an embodiment of connectors for connecting polymer rings.
Figure 9:
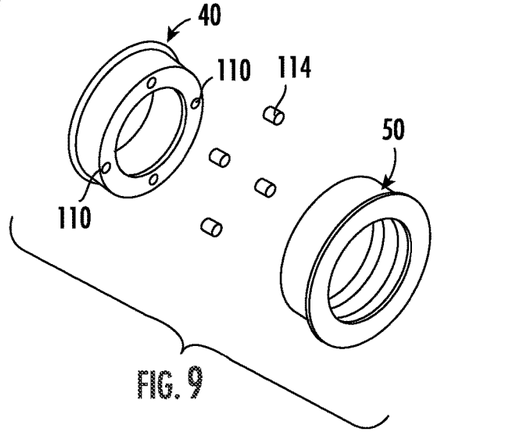
FIG. 9 is a partially exploded view showing another set of connectors.

The elevator sheave assemblies described above can be made or assembled by connecting selected polymer rings together. FIG. 8 shows one example arrangement in which the polymer rings include recesses 110 on at least one lateral surface of the ring. Connectors 112 are received in the recesses for securing two adjacent rings together. FIG. 9 shows another example embodiment in which spring pins 114 are used as the connectors.

Figure 10:
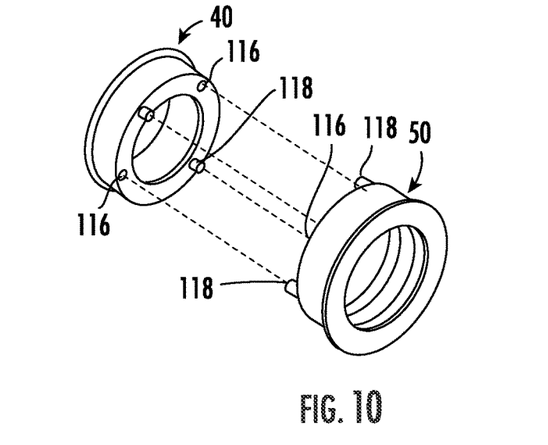
FIG. 10 is a partially exploded view of an example embodiment including connectors that are formed as part of the rings of the sheave assembly.

FIG. 10 illustrates an embodiment in which the rings include recesses 116 and projections 118 on at least one lateral surface. The arrangement of recesses 116 and projections 118 are the same on each of the illustrated rings 40 and 50. The projections 118 are configured to be at least partially received within the recesses 116 for securing two adjacent rings together. Depending on the configuration of the connectors 112, 114 or the projections 118, an adhesive may be used to establish a permanent connection between adjacent rings.

Figure 11:
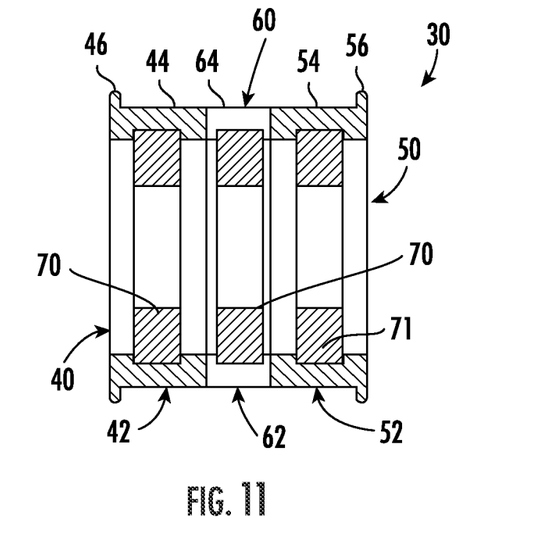
FIG. 11 is a cross-sectional view schematically illustrating an elevator sheave assembly including three rings that collectively establish a single belt-guiding surface.

FIG. 11 illustrates an embodiment including first and second polymer end rings 40 and 50 with one intermediate ring 60 between the end rings. The rings 40, 50 and 60 collectively establish a single belt-guiding surface having portions 44, 54 and 64. Each of the rings 40, 50 and 60 includes a bearing 70 within the ring. The single belt-guiding surface has three associated bearings 70, which can be useful, for example, when the expected load on the corresponding belt requires such support.

The example embodiments include multiple rings and multiple bearings 70 for each belt-guiding surface. In some of the disclosed embodiments, the number of bearings equals the number of rings and there are at least two bearings for each belt-guiding surface because each ring has an associated bearing. In other embodiments, there are more than two bearings for each belt-guiding surface or less than two bearings for each belt-guiding surface.

Figure 12:
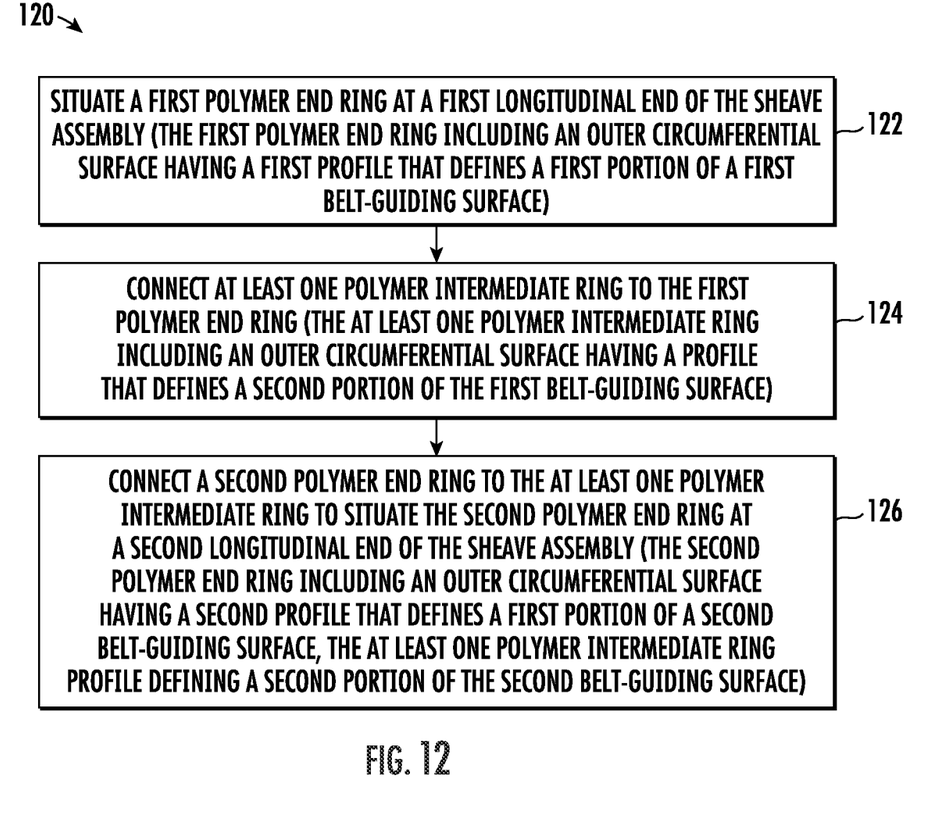
FIG. 12 is a flow chart diagram summarizing an example method of assembling an elevator sheave assembly.

FIG. 12 includes a flow chart diagram 120 that summarizes a method of making an elevator sheave assembly consistent with the embodiments discussed above. In the case of FIG. 12, at least one polymer intermediate ring is included between the first and second polymer end rings 40, 50. The example method includes, at 122, situating the first polymer end ring 40 at a first longitudinal end of the sheave assembly. At 124, a polymer intermediate ring 60 is connected to the first polymer end ring 40. At 126, the polymer intermediate ring 60 is connected to the second polymer end ring 50 to situate the second polymer end ring at a second longitudinal end of the sheave assembly.

Utilizing polymer rings of the type shown in the drawings and described above allows for accommodating a variety of sheave requirements in a variety of elevator system configurations. Having four basic polymer ring components allows for any number of belts to be accommodated and for establishing belt-guiding surfaces that can accommodate belts of different widths.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator sheave assembly, comprising:
   a plurality of polymer rings that are secured together, the plurality of polymer rings including at least two polymer rings that each have an outer circumferential surface;
   wherein the at least two polymer rings comprise
   a first polymer end ring where the outer circumferential surface has a first profile that defines a first portion of a first belt-guiding surface adjacent a first flange at one longitudinal end of the elevator sheave assembly, and
   a second polymer end ring where the outer circumferential surface has a second profile that defines a first portion of a second belt-guiding surface adjacent a second flange at an opposite longitudinal end of the elevator sheave assembly; and
   at least one polymer intermediate ring having one inner lateral edge associated with the first polymer end ring and an opposite inner lateral edge associated with the second polymer end ring, the at least one polymer intermediate ring including an outer circumferential surface having a third profile having a first portion associated with the first belt-guiding surface and a second portion associated with either the second belt-guiding surface or another belt-guiding surface between the third profile and the second belt-guiding surface.

2. The elevator sheave assembly of claim 1, wherein the at least two polymer rings each include a bearing supported inside an associated polymer ring, and wherein a polymer of each of the at least two polymer rings is over-molded onto a portion of the bearing to maintain the bearing within the associated polymer ring.

3. The elevator sheave assembly of claim 2, wherein each of the at least two polymer rings includes only a single bearing.

4. The elevator sheave assembly of claim 3, wherein the single bearing is situated at a position corresponding to a concentration of a load on the ring.

5. An elevator sheave assembly, comprising a plurality of polymer rings that are secured together, the plurality of polymer rings including at least two polymer rings that each have an outer circumferential surface that defines a portion of a belt guiding surface adjacent a flange at a longitudinal end of the elevator sheave assembly, the at least two polymer rings each including a bearing supported inside a respective polymer ring, and wherein
   the at least two polymer rings are a first polymer end ring and a second polymer end ring;
   the first polymer end ring is at a first longitudinal end of the polymer sheave assembly;
   the outer circumferential surface of the first polymer end ring has a first profile that defines a first portion of a first belt-guiding surface;

the second polymer end ring is at a second longitudinal end of the polymer sheave assembly;

the outer circumferential surface of the second polymer end ring has a second profile that defines a first portion of a second belt-guiding surface;

the plurality of polymer rings includes at least one polymer intermediate ring situated between and connected to the first and second polymer end rings; and the at least one polymer intermediate ring includes an outer circumferential surface having a profile that defines a second portion of the first belt-guiding surface and a second portion of the second belt-guiding surface.

6. The elevator sheave assembly of claim 5, wherein the at least one polymer intermediate ring comprises a plurality of polymer intermediate rings including a first intermediate ring that is received adjacent and connected to the first polymer end ring and a second intermediate ring that is received adjacent and connected to the second polymer end ring;

the profile of the outer circumferential surface of the first intermediate ring defines the second portion of the first belt-guiding surface; and the profile of the outer circumferential surface of the second intermediate ring defines the second portion of the second belt-guiding surface.

7. The elevator sheave assembly of claim 6, wherein the first intermediate ring is connected to the second intermediate ring;

the profile of the outer circumferential surface of the first intermediate ring defines a first portion of a third belt-guiding surface; and the profile of the outer circumferential surface of the second intermediate ring defines a second portion of the third belt-guiding surface.

8. The elevator sheave assembly of claim 7, wherein the profile of the outer circumferential surface of the first intermediate ring is the same as the profile of the outer circumferential surface of the second intermediate ring.

9. The elevator sheave assembly of claim 6, wherein the plurality of polymer intermediate rings includes at least one third intermediate ring between and connected to the first and second intermediate rings;

the profile of the outer circumferential surface of the first intermediate ring defines a first portion of a third belt-guiding surface;

the profile of the outer circumferential surface of the second intermediate ring defines a first portion of a fourth belt-guiding surface; and the profile of the outer circumferential surface of the at least one third intermediate ring defines a second portion of the third belt-guiding surface and a second portion of the fourth belt-guiding surface.

10. The elevator sheave assembly of claim 9, wherein the at least one third intermediate ring comprises two third intermediate rings;

the two third intermediate rings are connected together at a longitudinal center of the elevator sheave assembly; and the profiles of the outer circumferential surfaces of the two third intermediate rings define a fifth belt-guiding surface at the longitudinal center of the elevator sheave assembly.

11. The elevator sheave assembly of claim 5, comprising connectors that secure the at least one polymer intermediate ring to the first polymer end ring and the second polymer end ring.

12. The elevator sheave assembly of claim 11, wherein the connectors comprise separate pieces received at least partially into lateral surfaces on the at least one polymer intermediate ring and the first and second polymer end rings.

13. The elevator sheave assembly of claim 11, wherein the connectors are formed as part of the at least one polymer intermediate ring or the first and second polymer end rings.

14. The elevator sheave assembly of claim 13, wherein the first and second polymer end rings include at least one of projections extending from a lateral surface and recesses in the lateral surface;

the at least one polymer intermediate ring includes at least one of recesses in lateral surfaces on the at least one polymer intermediate ring and projections extending from the lateral surfaces on the at least one polymer intermediate ring; and the projections and the recesses cooperate to connect the at least one polymer intermediate ring to the first and second polymer end rings.

15. A method of making an elevator sheave assembly, the method comprising:

situating a first polymer end ring at a first longitudinal end of the sheave assembly, the first polymer end ring including an outer circumferential surface having a first profile that defines a first portion of a first belt-guiding surface;

connecting at least one polymer intermediate ring to the first polymer end ring, the at least one polymer intermediate ring including an outer circumferential surface having a profile that defines a second portion of the first belt-guiding surface; and connecting a second polymer end ring to the at least one polymer intermediate ring to situate the second polymer end ring at a second longitudinal end of the sheave assembly, the second polymer end ring including an outer circumferential surface having a second profile that defines a first portion of a second belt-guiding surface, the at least one polymer intermediate ring profile defining a second portion of the second belt-guiding surface.

16. The method of claim 15, wherein the at least one polymer intermediate ring comprises a plurality of polymer intermediate rings including a first intermediate ring and a second intermediate ring; and the method comprises connecting the first intermediate ring to the first polymer end ring, connecting the second intermediate ring to the second polymer end ring, and connecting the first intermediate ring to the second intermediate ring.

17. The method of claim 16, wherein the profile of the outer circumferential surface of the first intermediate ring defines the second portion of the first belt-guiding surface;

the profile of the outer circumferential surface of the first intermediate ring defines a first portion of a third belt-guiding surface;

the profile of the outer circumferential surface of the second intermediate ring defines the second portion of the second belt-guiding surface; and the profile of the outer circumferential surface of the second intermediate ring defines a second portion of the third belt-guiding surface.

18. The method of claim 16, wherein the first profile is the same as the second profile; and the profile of the outer circumferential surface of the first intermediate ring is the same as the profile of the outer circumferential surface of the second intermediate ring.

19. The method of claim 15, comprising over-molding the material of the first polymer end ring onto a bearing; and over-molding the material of the second polymer end ring onto a bearing.

20. The method of claim 19, comprising situating the bearing of each of the polymer end rings in a position corresponding to a concentration of a load on the polymer end ring.

* * * * *